United States Patent Office 2,983,860
Patented May 9, 1961

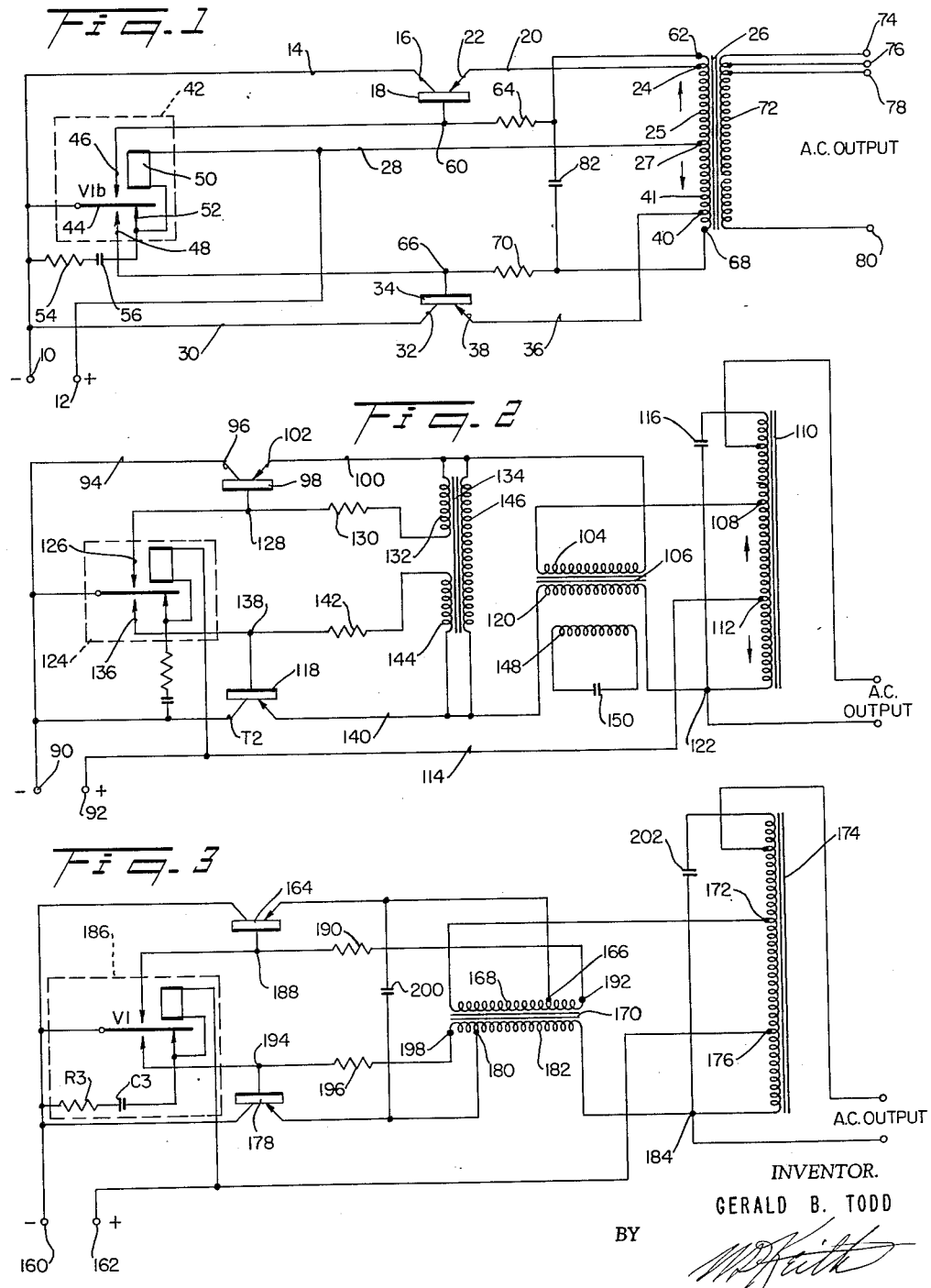

2,983,860

VIBRATOR CONTROLLED TRANSISTOR INVERTER

Gerald B. Todd, Indianapolis, Ind., assignor to Cornell-Dubilier Electric Corporation, a corporation of Delaware Filed Oct. 9, 1957, Ser. No. 689,136

8 Claims. (Cl. 321—44)

This invention relates to vibrator type inverters and particularly to a vibrator controlled transistor inverter unit.

The invention may be briefly described as an improved inverter unit in which the load currents are handled by transistors whose selective operation to effect the desired commutation of a direct current source is controlled by a vibrator unit. Among the advantages flowing from the invention herein disclosed are the maintenance of exceptional frequency stability over wide ranges of variation in both load and input voltage as well as the attaining of an appreciably longer operating life for operations at or below rated capacity.

The object of this invention is the provision of an inverter unit of improved character and having an appreciably extended period of useful operating life.

Another object of this invention is the provision of a vibrator controlled transistor inverter unit.

Other objects and advantages of the invention will be disclosed in the following specification and claims and in the accompanying drawings which illustrate, by way of example, the principles of the invention and the presently preferred embodiments incorporating those principles.

Referring to the drawings:

Fig. 1 is a circuit diagram of an improved inverter unit incorporating the principles of this invention;

Fig. 2 is a circuit diagram of an improved sine wave regulated inverter unit adapted for operations with relatively low input voltages and incorporating the principles of this invention;

Fig. 3 is a circuit diagram of an improved sine wave regulated inverter generally similar to that as shown in Fig. 2 but modified for operations with a higher range of input voltages.

Figure 1 illustrates the essentials of an improved inverter construction embodying the principles of this invention. There is provided a pair of input terminals 10, 12 adapted to be connected to a source of direct current such as a battery or other supply. As illustrated the terminal 10 is adapted to be connected to the negative side of the direct current supply and the terminal 12 to the positive side thereof. Connected across the input terminals 10, 12 are a pair of power circuits for the desired commutation of the input current. The first of such power circuits includes, in series, the lead 14 connecting the negative input terminal 10 to the collector terminal 16 of a transistor 18, a lead 20 connecting the emitter terminal 22 of the transistor 18 to a tap 24 on the primary winding of a transformer 26, the portion 25 of the primary winding included between said tap 24 and a second tap 27, and a return lead 28 connecting the tap 27 on said primary winding to the positive input terminal 12. The second of such power circuits includes, in series, the lead 30 connecting the negative input terminal 10 to the collector terminal 32 of a second transistor 34, a lead 36 connecting the emitter terminal 38 of the transistor 34 to a tap 40 on the primary winding of the transformer 26, the portion 41 of the primary winding disposed intermediate the tap 40 and the tap 27, and the above mentioned common return lead 28 connecting the tap 27 to the positive input terminal 12.

Also connected across the pair of input terminals 10, 12 is a vibrator assembly generally designated 42. The vibrator assembly 42 may be conventional in nature and, as illustrated, includes a vibrating reed member or movable arm 44 electrically connected to the negative input terminal 10 and carrying suitable contacts adapted to alternately engage the stationary opposed contacts 46 and 48. The movable arm 44 is arranged to be magnetically actuated by a motor coil 50 which is adapted to be energized through a drive circuit which includes a separate drive contact 52 positioned to be engaged by the movable arm 44 at one point in its path of displacement. Specifically one side of the coil 50 is connected to the contact 52 and the other side thereof is connected to the positive input terminal 12. The drive circuit for the movable arm also preferably includes a spark suppressing circuit including the resistor 54 and capacitor 56 connected in series intermediate the drive contact 52 and the negative input terminal 10.

The vibrator assembly 42 forms part of a control circuit arranged to regulate the selective operation of the above described first and second power circuits to effect the desired commutation of the direct current input voltage. The control circuit includes the connection of the stationary contact 46 to the base element 60 of the transistor 18 in the first power circuit which, in turn, is connected to a tap 62 at or adjacent one end of the primary winding of the transformer 26 adjacent the tap 24 through a biasing resistor 64. The other stationary contact 48 of the vibrator assembly is similarly connected to the base element 66 of the transistor 34 disposed in the second power circuit which, in turn, is connected to a tap 68 at or adjacent the other end of the primary winding of the transformer 26 adjacent the tap 40 through a biasing resistor 70. The connection of the transistor base elements 60 and 66 to the taps 62 and 68 coupled with the connection of the transistor emitter terminals 22 and 38 to the taps 24 and 40 respectively seem to provide a source of bias voltage for operational control of the transistors 18 and 34.

The secondary winding 72 of the transformer 26 may be suitably tapped to provide a plurality of output terminals 74, 76, 78 and 80 across which an alternating current output from the unit may be obtained.

In operation of the illustrated unit, engagement of the stationary contact 46 by the movable arm 44 of the vibrator assembly 42 results in the application of the negative direct current source voltage to both the base and collector terminals 60 and 16 respectively of the transistor 18. Such voltage equalization renders transistor 18 conductive and permits a unidirectional current to flow in the first power circuit and which includes a current flow in the direction indicated by the arrow in that portion of the primary winding of the transformer 26 included intermediate the taps 27 and 24. Displacement of the movable arm 44 out of engagement with the stationary contact 46 serves to open the bias circuit, remove the negative source potential from the base 60 of the transistor 18 and permit application of the developed bias voltage to the base 60 to cut off current flow though said transistor 18 and through the first power circuit. Subsequent engagement of the movable arm 44 with the stationary contact 48 effects application of the negative direct current source voltage to both the base and collector terminals 66 and 32 respectively of the transistor 34. Such equalization of applied voltage renders transistor 34 conductive and permits unidirectional current flow in the second power circuit. Such current flow in the second power circuit includes a flow of current in the direction indicated by the arrow through the portion of the primary winding disposed intermediate the taps 27 and 40.

The displacement of the movable arm 44 out of engagement with the contact 46 and into engagement with contact 48 also results in energization of the drive coil 50 through completion of the drive circuit by engagement of the contact 52 by the movable arm member 44. The energization of the drive coil 50 results, as is conventional in vibrator operation, in displacement of the movable arm 44 out of engagement with the contacts 48 and 52 and into re-engagement with the contact 46. The displacement of the movable arm 44 out of engagement with the contact 48 removes the negative source voltage from the base 66 thereof and permits the developed bias to render the transistor 34 non-conducting with a consequent cessation of current flow through the second power circuit.

It will be apparent from the above that in the illustrated embodiment, the heavier or primary current is carried by the transistor containing first and second power circuits and that the only current commutated by the vibrator assembly 42 is that relatively small and limited amount necessary to control the selective operation of the transistors 18 and 34. In actual operation, the control circuit current, i.e., that passed by the vibrator unit itself, is 1/10 or less than the amount of the primary current flowing through the first and second power circuits. This marked limitation in current flow through the vibrator unit results in appreciable increases in the useful operating life of the vibrator assembly and in a concurrent increase in the useful operating life of the entire unit as long as the primary currents handled by the transistors do not appreciably exceed their rated capacities. In addition to a permitted marked increase in useful operating life of the inverter unit, other advantages attendant the invention herein disclosed include the efficient utilization of the current handling characteristics of transistor elements and the recognized frequency stability of vibrator type assemblies.

Apart from the above described circuit elements, I have found that inclusion of a suitably sized tuning or buffer capacitor 82 connected across the primary winding of the transformer 26 is effective to reduce the peaks in the generated wave and to thereby somewhat improve the operational characteristics of the entire unit.

Fig. 2 illustrates a circuit for a sine wave regulated inverter incorporating the principles of the invention as adapted for preferred operations with relatively low input voltage. The output voltage of such a unit will have an approximate sine wave configuration.

There is shown a pair of input terminals 90 and 92 adapted to be connected to the negative and positive output terminals of a suitable source of direct current. Connected across the input terminals 90, 92 are a pair of power circuits for the desired commutation of the input current. The first power circuit includes the lead 94 connecting the negative input terminal 90 to the collector terminal 96 of a transistor 98, the lead 100 connecting the emitter terminal 102 of the transistor 98 through a winding 104 of a linear reactor 106, operable in an unsaturated condition, to a tap 108 on a power transformer 110, through the portion of the power transformer winding disposed intermediate said tap 108 and a tap 112, and the lead 114 connecting the tap 112 to the positive input terminal 92. The second power circuit is similarly connected and includes a series connection through the collector and emitter terminals of a transistor 118, the winding 120 of the linear reactor 106, that portion of the power transformer 110 included between the output tap 122 and the aforementioned tap 112 and the common return lead 114 connecting said tap 112 to the input terminal 92. The transformer 110 serves as a power transformer operating in a saturated condition in connection with a tank capacitor 116 as is conventional in sine wave regulated vibrator type inverters.

A vibrator assembly, generally designated 124, is, as was the case with the previously described embodiment, also connected across the input terminals 90 and 92 and serves to control the selective operation of the transistor elements included in the first and second power circuits to effect the desired commutation of the direct current input voltage. The control circuit for the first power circuit includes the stationary contact 126 connected to the base 128 of the transistor 98, the bias resistor 130 and the secondary winding 132 of a transformer 134. The control circuit for the second power circuit includes the stationary contact 136 connected to the base 138 of the transistor 118, the bias resistor 142 and the secondary winding 144 of the transformer 134. The primary 146 of the transformer 134 is connected across the linear reactor 106 and the secondaries 132 and 144 thereof are so connected and phased as to provide the necessary cut-off bias for the transistors 98 and 118 through their respective biasing resistors.

The described circuitry with buffer capacitor 150 connected across a separate winding 148 on the linear reactor 106 is preferred for operations with lower input voltages such as 6 and 12 volts and possibly on 24 volts direct current.

The operation of the above described unit is essentially similar to that described earlier in conjunction with Fig. 1 except for the operational phase modifications attendant the sine wave regulating components of the illustrated circuit. When the movable arm of the vibrator assembly 124 is in engagement with the stationary contact 126 the negative direct current supply voltage is applied to both the base 128 and collector terminal 96 of the transistor 98 in the first power circuit. This equalization of applied voltage renders the transistor 98 conductive with a consequent current flow through the first power circuit. The displacement of the movable arm out of engagement with the stationary contact 126 results in the removal of the negative source voltage from the base 128 of transistor 98 and in the application of sufficient bias voltage thereto to render said transistor 98 non-conducting and in a consequent cessation of current flow through the first power circuit. In a similar manner the engagement and subsequent disengagement of the movable arm with the stationary contact 136 results in energization and subsequent deenergization of the second power circuit with its consequent initiation and cessation of current flow therethrough. Insofar as the sine wave regulating components are concerned the saturable transformer 110 and the capacitor 116 connected thereacross become inductive and capacitive in character when the voltage thereacross is higher or lower, respectively, than a predetermined value. The utilization of a common core in transformer 110 permits the unidirectional current flow in the first and second power circuits to effect a magnetization thereof in the form of a substantially symmetrical alternating current. As such the voltage across the transformer 110 adds vectorially to the commutated voltage in the power circuits to maintain a substantially constant output voltage irrespective of variations in the direct current source voltage applied to input terminals 90 and 92. The windings 104 and 120 of the linear reactor 106 are connected so that the direct current components flowing therethrough are in opposition and do not induce any appreciable unidirectional flux in the core thereof. The voltages appearing across either of the windings has a substantially symmetrical form.

Fig. 3 illustrates a simplified modification of the circuit of Fig. 2 to provide a sine wave regulated unit that is particularly adapted for operations with higher direct current source voltages. There is shown a pair of input terminals 160 and 162 adapted to be connected to the negative and positive output terminals of the suitable source of direct current. Connected across the input terminals 160, 162 are a pair of power circuits for the desired commutation of the input current. The first power circuit includes the transistor 164, that portion of the winding 168 of a linear reactor 170 included intermediate the tap 166 and the end thereof, and the portion of the winding disposed between taps 172 and 176 of the power transformer 174. The second power circuit includes the transistor 178, that portion of the winding 182 of the linear reactor 170 disposed intermediate the tap 180 and the end thereof and that portion of the winding of the power transformer 174 disposed intermediate the taps 184 and 176.

A vibrator assembly, generally designated 186, is, as was the case with the previously described embodiments, also connected across the input terminals 160 and 162 and serves to control the selective operation of the transistor elements included in the first and second power circuits to effect the desired commutation of the direct current input voltage. In this embodiment the necessary bias voltage for the transistor 164 in the first power circuit is obtained by connecting the base 188 thereof to the tap 192 on the winding 168 of the linear reactor 170 through a biasing resistor 190. In a similar manner the base 194 of the transistor 178 included in the second power circuit is connected to the tap 198 on the winding 182 of the linear reactor 170 through the biasing resistor 196.

A capacitor 202 is connected across the windings of the power transformer 174 for the purposes described earlier in conjunction with the embodiment illustrated in Fig. 2.

The circuit illustrated in Fig. 3 operatively functions in a similar manner to that described above in conjunction with Fig. 2, the points of difference being the provision of a buffer capacitor 200 connected across the first and second power circuits instead of across an auxiliary winding on the linear reactor and the provision of taps on the linear reactor, instead of a separate transformer, to provide the necessary bias voltages for the transistors included in the first and second power circuits.

Having thus described my invention I claim:

1. A vibrator controlled transistor inverter comprising first and second power circuits connectable to a direct current source each including a series connected transistor disposed in series with at least a portion of a transformer winding and means for effecting alternate energization of said circuits including a vibrator assembly having a vibrating element and a drive circuit therefor connected across said direct current source and circuit means responsive to the positional disposition of said vibrating element for alternately applying a conduction control potential to said transistors to render the same alternately conductive and non-conductive to produce sequential and alternately directed current flow through said transformer winding.

2. A vibrator controlled transistor inverter comprising a pair of input terminals for connection to a source of direct current, a transformer having a pair of output terminals for delivery of alternating current, first and second power circuits connected across said pair of input terminals each including a transistor disposed in series with at least a portion of said transformer, a vibrator assembly having a vibrating element and a drive circuit therefor connected across said pair of input terminals and circuit means responsive to the position of said vibrating element for alternately connecting the base elements of said transistors to a biasing potential to render said transistors alternately conducting and non-conducting in accordance with the rate of vibration of said vibrator assembly.

3. A vibrator controlled transistor inverter comprising a pair of input terminals for connection to a source of direct current, a transformer having a pair of output terminals for delivery of alternating current, first and second power circuits connected across said pair of input terminals each including a transistor disposed in series with at least a portion of said transformer, a vibrator assembly having a vibrating element and a drive circuit therefor connected across said pair of input terminals and first and second control circuits alternately connectable across said pair of input terminals and energizable in response to the position of the vibrating element for selectively and alternately connecting the base elements of said transistors through a portion of a winding of said transformer to a biasing potential to render said transistors conducting and non-conducting in accordance with the position of said vibrating element.

4. A vibrator controlled transistor inverter comprising a pair of input terminals for connection to a source of direct current, first and second power circuits connected across said pair of input terminals each including a series connected transistor and at least a portion of a transformer winding, a vibrator assembly having a vibrating element and a drive circuit therefor connected across said input terminals and circuit means selectively energizable in response to the positional disposition of the vibrating element for alternately connecting the current flow control elements of said transistors through a portion of the winding of said transformer to a conduction control potential for selectively controlling current flow through said power circuits in response to operation of said vibrator assembly.

5. A vibrator controlled transistor inverter as specified in claim 4 including buffer means connected across said transformer winding to reduce the peaks in the output current.

6. A vibrator controlled transistor inverter comprising a pair of input terminals for connection to a source of direct current, a power transformer operable in saturated condition with a capacitor connected thereacross, first and second power circuits connected across said input terminals each including a transistor, a reactor winding and at least a portion of said power transformer, a vibrator assembly having a vibrating element and a drive circuit therefor connected across said pair of input terminals and circuit means energizable in response to the positional disposition of the vibrating element for alternately connecting the base elements of said transistors to a biasing potential for selectively and alternately permitting current flow therethrough.

7. The vibrator controlled transistor inverter as specified in claim 6 wherein said circuit means includes connections to said reactor winding to provide bias voltage for said transistors.

8. A vibrator controlled inverter comprising a pair of input terminals for connection to a source of direct current, a transformer having a pair of output terminals for delivery of alternating current, a pair of switching devices of the type which is capable of being rendered conducting or non-conducting in accordance with an applied electrical bias, first and second power circuits connected across said pairs of input terminals each including one of said switching devices disposed in series with at least a portion of said transformer, a vibrator assembly having a vibrating element and a drive circuit therefor connected across said pair of input terminals and circuit means responsive to the position of said switching devices to a source of electrical bias to render said switching devices alternately conducting and non-conducting in accordance with the rate of vibration of said vibrator assembly.

References Cited in the file of this patent

UNITED STATES PATENTS

| | | |
|---|---|---|
| 2,021,888 | Dawson | Nov. 26, 1935 |
| 2,475,621 | Klemperer | July 12, 1949 |
| 2,756,286 | Johnson et al. | July 24, 1956 |
| 2,783,384 | Bright | Feb. 26, 1957 |

UNITED STATES PATENT OFFICE
CERTIFICATE OF CORRECTION

Patent No. 2,983,860                      May 9, 1961

Gerald B. Todd

It is hereby certified that error appears in the above numbered patent requiring correction and that the said Letters Patent should read as corrected below.

Column 6, line 55, for "pairs" read -- pair --; line 60, after "position" insert -- of said vibrating element for alternately connecting the control elements --.

Signed and sealed this 26th day of September 1961.

(SEAL)
Attest:

ERNEST W. SWIDER                      DAVID L. LADD
Attesting Officer                      Commissioner of Patents

USCOMM-DC